(12) United States Patent
Jillings (10) Patent No.: US 9,553,864 B2
(45) Date of Patent: *Jan. 24, 2017

(54) DUAL CODE AUTHENTICATION SYSTEM

(71) Applicant: TeleSign Corporation, Marina del Rey, CA (US)

(72) Inventor: Steven H. Jillings, Marina del Rey, CA (US)

(73) Assignee: TeleSign Corporation, Marina del Rey, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/634,520

(22) Filed: Feb. 27, 2015

(65) Prior Publication Data

US 2015/0180855 A1    Jun. 25, 2015

Related U.S. Application Data

(63) Continuation of application No. 13/689,646, filed on Nov. 29, 2012, now Pat. No. 8,973,109.

(60) Provisional application No. 61/564,531, filed on Nov. 29, 2011.

(51) Int. Cl.
  *G06F 7/04* (2006.01)
  *H04L 29/06* (2006.01)

(52) U.S. Cl.
  CPC ............... *H04L 63/08* (2013.01); *H04L 63/12* (2013.01); *H04L 63/18* (2013.01)

(58) Field of Classification Search
  CPC ........ G06F 21/31; H04L 63/083; H04L 63/08; H04L 63/0428
  See application file for complete search history.

(56) References Cited

U.S. PATENT DOCUMENTS

| | | | |
|---|---|---|---|
| 4,782,519 A | 11/1988 | Patel et al. | |
| 5,881,226 A | 3/1999 | Veneklase | |
| 5,995,606 A | 11/1999 | Civanlar et al. | |
| 6,012,144 A | 1/2000 | Pickett | |
| 6,044,471 A | 3/2000 | Colvin | |
| 6,058,415 A | 5/2000 | Polcyn | |
| 6,088,683 A | 7/2000 | Jalili | |
| 6,097,791 A | 8/2000 | Ladd et al. | |

(Continued)

FOREIGN PATENT DOCUMENTS

| WO | WO-95/19593 | 7/1995 |
|---|---|---|
| WO | WO-2006076006 | 7/2006 |

OTHER PUBLICATIONS

Peter Tapling, Highly Auditable Self-Service Life-Cycle Management for Electronic Security Credentials, 2003 Annual Computer Security Applications Conference, Las Vegas, NV, 2003, 26 pages.

(Continued)

*Primary Examiner* — Ali Abyaneh
(74) *Attorney, Agent, or Firm* — Perkins Coie LLP (57) ABSTRACT

A verification method and system are disclosed that verify a user. The user is provided a verification code via, for example, a website, to be communicated to the system via an application on a mobile communication device. If the correct verification code is communicated by the user, the user receives via the application a verification message containing another verification code, which the user submits to a website or on-line form or to another verification system for authentication.

22 Claims, 5 Drawing Sheets

(56) References Cited

U.S. PATENT DOCUMENTS

| | | |
|---|---|---|
| 6,167,518 A | 12/2000 | Padgett et al. |
| 6,175,626 B1 | 1/2001 | Aucsmith et al. |
| 6,256,512 B1 | 7/2001 | Verdonk |
| 6,259,909 B1 | 7/2001 | Ratayczak et al. |
| 6,563,915 B1 | 5/2003 | Salimando |
| 6,574,599 B1 | 6/2003 | Lim et al. |
| 6,643,363 B1 | 11/2003 | Miura |
| 6,934,858 B2 | 8/2005 | Woodhill |
| 7,043,230 B1 | 5/2006 | Geddes et al. |
| 7,054,417 B2 | 5/2006 | Casey et al. |
| 7,127,051 B2 | 10/2006 | Bedingfield et al. |
| 7,233,790 B2 | 6/2007 | Kjellberg et al. |
| 7,251,827 B1 * | 7/2007 | Guo .................. G06F 21/31 726/10 |
| 7,287,270 B2 | 10/2007 | Kai |
| 7,383,572 B2 | 6/2008 | Rolfe |
| 7,389,913 B2 | 6/2008 | Starrs |
| 7,447,662 B2 | 11/2008 | Gibson |
| 7,574,733 B2 | 8/2009 | Woodhill |
| 7,870,599 B2 | 1/2011 | Pemmaraju |
| 7,945,034 B2 | 5/2011 | Gonen et al. |
| 8,024,567 B2 | 9/2011 | Han |
| 8,302,175 B2 * | 10/2012 | Thoursie .................. H04L 63/18 726/9 |
| 8,462,920 B2 | 6/2013 | Gonen et al. |
| 8,472,590 B1 * | 6/2013 | Curtis .................. H04M 7/0027 379/202.01 |
| 8,687,038 B2 | 4/2014 | Gonen et al. |
| 2001/0032192 A1 | 10/2001 | Putta et al. |
| 2002/0004831 A1 | 1/2002 | Woodhill |
| 2003/0191712 A1 | 10/2003 | Ohmae |
| 2003/0221125 A1 | 11/2003 | Rolfe |
| 2004/0030607 A1 | 2/2004 | Gibson |
| 2004/0030935 A1 | 2/2004 | Kai |
| 2004/0254890 A1 | 12/2004 | Sancho et al. |
| 2006/0153346 A1 | 7/2006 | Gonen et al. |
| 2006/0179304 A1 * | 8/2006 | Han .................. G06Q 20/027 713/168 |
| 2009/0328177 A1 | 12/2009 | Frey et al. |
| 2010/0287606 A1 * | 11/2010 | Machani .................. G06F 21/34 726/7 |
| 2013/0272512 A1 | 10/2013 | Gonen et al. |

OTHER PUBLICATIONS

Rose Maciejewski, Authentify Showcases Rapidly Deployable Two-Factor Online Authentication System at 28th Annual Computer Security Institute Conference, Chicago, IL, Oct. 23, 2001, 2 pages.

International Search Report for International Application PCT/US05/13730, Mail Date Jan. 31, 2006, 4 pages.

* cited by examiner

DUAL CODE AUTHENTICATION SYSTEM

CROSS-REFERENCE TO RELATED APPLICATION(S)

This application is a continuation of U.S. patent application Ser. No. 13/689,646, entitled "DUAL CODE AUTHENTICATION SYSTEM" filed Nov. 29, 2012, which claims the benefit of U.S. Provisional Patent Application No. 61/564,531, entitled "DUAL PIN CODE SMS AUTHENTICATION SYSTEM" filed Nov. 29, 2011, which is incorporated herein by reference in its entirety.

BACKGROUND

With the increasing popularity of the Internet, it has become more important to require users to register with the websites they use in order for them to obtain information from the website, order goods through the website, store information through the website, etc. In some instances, the owners of the website wish to use the registration information to selectively target promotions or advertisements based on registration information and thus, get a secondary gain in addition to having the registrant or user visit the website or use the services provided through the website. In other instances, the user's registration information is not used for secondary gain, but instead is kept completely confidential and is used only for the purposes of allowing the registrant or user to enter the website and obtain information or goods and services through the website.

User authentication is fundamental to every Internet transaction. Individuals and businesses who wish to engage in trade on-line must authenticate themselves reliably by presenting credentials to establish their identity. Despite this, when doing business on the Internet, potential registrants or users often register with untraceable or false e-mail addresses and phone numbers. This can compromise the intended purpose of the registration, create a breach of security, and constitute fraud on the website owners.

DETAILED DESCRIPTION

A dual code verification system and method are described that verify an identity of a user of a service. For example, the user of the service may be a registrant of a website who is accessing the website via a personal computer or a customer of an online retailer attempting to buy a product. The registrant may be verified via short message service (SMS) messages with a mobile device associated with the registrant. In some implementations, the dual code verification system authenticates a previously-registered user using information received from a prior registration by the user.

The dual code verification system verifies a user of a service through a process under which two verification codes are transmitted to and received from the user. The dual code verification system transmits the first verification code along with electronic contact information to the user. For example, the dual code verification system may display a telephone number and an alphanumeric code on a website visited by a user or within an application used by a user on a mobile device or computer. The dual code verification system also requests that the user communicate the verification code back to the dual code verification system using the electronic contact information. The dual code verification system receives a verification code sent by the user using the electronic contact information. The dual code verification system compares the received and transmitted verification codes. If the verification codes substantially match, the dual code verification system transmits the second verification code to the user, sending the code to an electronic address associated with a device or account from which the first verification code was received. For example, if a user has sent an SMS message containing a verification code from a mobile device, the dual code verification system may transmit the second verification code via SMS message to the mobile device using a telephone number associated with the mobile device. The dual code verification system instructs the user to submit the second received verification code in a different manner than how the user received it from the dual code verification system. For example, the dual code verification system may instruct the user to submit the second verification code via a website visited by the user or an application used by the user. This may be the same website or application used to transmit the first verification code to the user. The dual code verification system verifies the user if the second received verification code substantially matches the second verification code transmitted to the user.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention. Although many embodiments and implementations of the system are described with respect to sending and receiving a PIN code, a verification code, and the like, in some implementations, other information may be used to verify a user. For example, the dual code verification system may transmit an image of an object to a mobile device and instruct the user to transmit back to the system the name of the object.

In some embodiments, a registration form is provided on a website. A user of the website, such as a registrant or a user browsing the website, is informed via the website to send an electronic message containing the verification code (e.g., a Personal Identification Number ("PIN")) to a contact number. The verification code may be a generated Identification PIN Code ("IPC"). Additionally, the contact number can be a long code phone number or a shorter phone number (e.g., short code). Both the IPC verification code and contact number are provided to the website registrant upon the registrant's entry of his or her name, username, and password. The electronic message may comprise an SMS message sent by the registrant using the registrant's SMS-enabled handset or cellular telephone, or other SMS—or similarly enabled device. Although the registrant or user typically establishes an SMS-based connection with the dual code verification system via the registrant's or user's handset or cellular telephone, other embodiments of the present invention include providing a system telephone number for the registrant or user to call to enter this information. Once the dual code verification system receives the registrant's electronic message containing the verification code or IPC, another verification code or Authentication PIN Code ("APC") is generated and returned via an electronic message to the registrant's same handset, cellular telephone, or other similarly enabled device that was initially used by the registrant to send the first verification code, or IPC. The registrant or user then inputs the second verification code, or APC, into the registration screen on the website. The result is either authentication for a correct entry, or potential rejection for an incorrect entry, according to the verification-requesting-website's preferences.

In some embodiments, after initial registration wherein a user has already successfully established a username and password for a website through the above or a similar process, and wherein that website has retained and stored that user's log-in information and previously used handset or cellular telephone number, the user attempts to later gain admittance to the website on a subsequent visit. When the user attempts to access that particular website, the user is informed by the website to send an electronic message including a verification code or generated IPC to a contact number. Both the verification code and the contact number are provided by the website once the user inputs his or her previously established username and password. The electronic message may comprise an SMS message sent by the user via his or her SMS-enabled handset or cellular telephone, or other SMS—or similarly enabled device. The electronic message sent by the user contains the verification code or IPC. Although the user may establish an SMS-based connection with the dual code verification system via the user's handset or cellular telephone, other embodiments of the present invention include providing a dual code verification system telephone number for the user to call to manually enter this information. Once the dual code verification system receives the user's electronic message, the system attempts to verify the user's handset, cellular telephone, or other similarly SMS-enabled device. And if verified, a second verification code or APC is generated and returned via electronic message to the user's same handset, cellular telephone, or other similarly SMS-enabled device. The APC verification code is then input by the user into the registration screen on the website, resulting in either authentication for a correct entry, or potential rejection for an incorrect entry, according to the verification-requesting-website's preferences.

Suitable Environments

Figure 1:
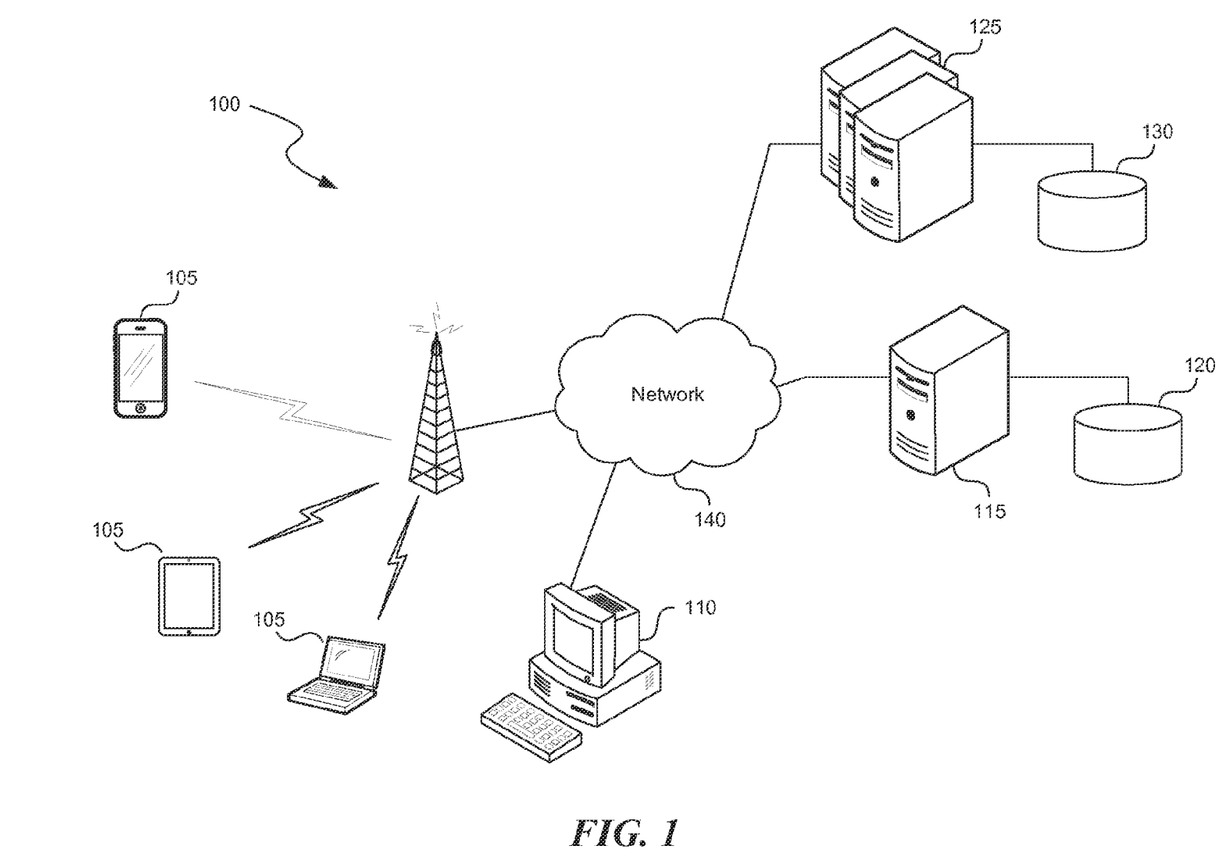
FIG. 1 is a diagram of a suitable environment in which a dual code verification system operates.

FIG. 1 and the following discussion provide a brief, general description of a suitable computing environment 100 in which a dual code verification system is implemented. The computing environment 100 includes a mobile device 105 (e.g., a smartphone) and a computing device 110 (e.g., a personal computer), through which a user may access a server computer 115 and one or more third party server computers 125. The server computers 115 and 125 utilize data storage areas 120 and 130, respectively. As will be described in more detail herein, the dual code verification system may in part reside on the server computer 115, and verify the identity of a user who is utilizing a personal computer 110 or mobile device 105 to access websites, applications, or other services provided by the third party server computers 125. The data storage area 120 contains data utilized by the dual code verification system, and, in some implementations, software necessary to perform functions of the system. For example, the data storage area 120 may contain data associated with a user, such as a mobile communication number associated with a user's mobile device 105. As will be described in more detail herein, as part of a verification process, the system may utilize the mobile communication number for sending a verification message to the user's mobile device 105. The system may also receive a verification message from the mobile communication device.

The mobile communication device 105, personal computer 110, server computer 115 and third party server computers 125 communicate with each other through one or more public or private, wired or wireless networks 140, including, for example, the Internet. The mobile device 105 communicates wirelessly with a base station or access point using a wireless mobile telephone standard, such as the Global System for Mobile Communications (GSM), Long Term Evolution (LTE), IEEE 802.11, or another wireless standard, and the base station or access point communicates with the server computer 115 and third party server computers 125 via the networks 140. Computers 110 communicate through the networks 140 using, for example, TCP/IP protocols. The mobile device 105 utilizes applications or other software, which operate through the use of computer executable instructions. Some such applications may be directed toward the verification process (e.g. providing a button on the screen for a user to press as part of completing a dual code verification process). As will be described in more detail herein, the dual code verification system residing at least in part on the server computer 115 may also utilize software which operates through the use of computer-executable instructions as part of the authentication and identity process.

Although not required, aspects and implementations of the invention will generally be described in the general context of computer-executable instructions, such as routines executed by the mobile device 105, the computing device 110, the server computer 115, the third party server computers 125, or other computing systems. The invention can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

The system and method can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the invention described herein may be stored or distributed on tangible, non-transitory computer-readable media, including magnetic and optically readable and removable computer discs, stored in firmware in chips (e.g., EEPROM chips). Alternatively, aspects of the invention may be distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

Dual Code Verification Systems

Figure 2:
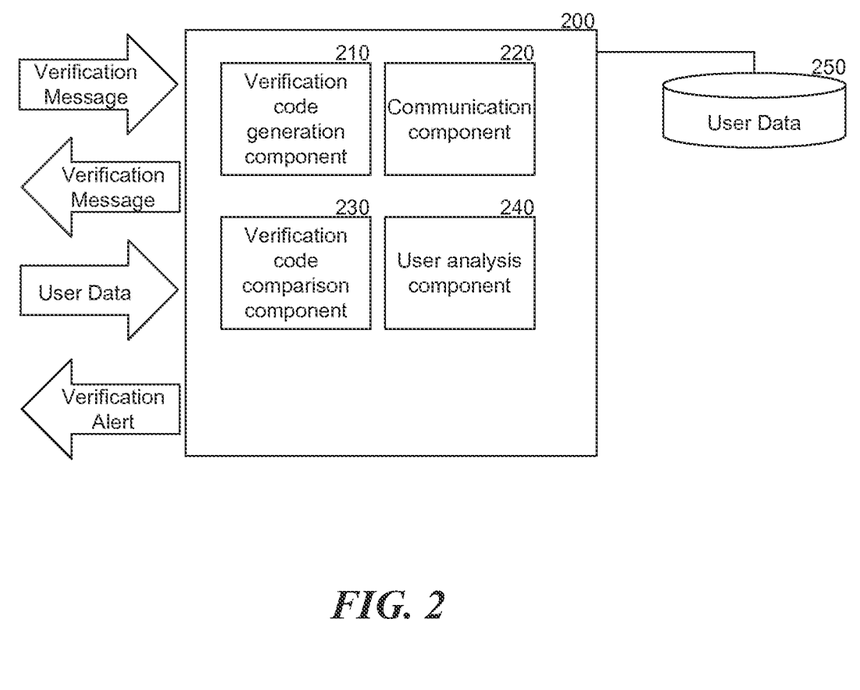
FIG. 2 is a block diagram of a dual code verification system.

FIG. 2 is a block diagram of various modules of a dual code verification system 200. The dual code verification system 200 verifies an identity of a user of a service. The dual code verification system 200 includes a verification code generation component 210, a communication component 220, a verification code comparison component 230, and a user analysis component 240. The dual code verification system 200 accesses and/or stores data in user data storage area 250.

The dual code verification system 200 sends and receives verification messages, receives user data, and sends verification alerts. A verification message can include various types of information, including a verification code (e.g., an alphanumeric PIN), contact information (e.g., a telephone number), and instructions for transmitting a verification message, including, for example, an electronic address. In some implementations, a verification message is sent to or received from a user of a website or application. In some implementations, a verification message is an SMS message. In some implementations, a verification message is data sent to or received from a third party to facilitate the verification of a user. For example, a verification message may include web data that is sent to a website for display to the user or to otherwise facilitate the verification of the user. User data includes data associated with the user or submitted by the user. User data may include contact information for a user, such as a mobile device identifier (e.g., a phone number), a username, an email address, and so forth. User data may also include information submitted by a user, such as information submitted by a user via a form displayed on a webpage. A verification alert includes a message sent to a user or a third party indicating whether a user is verified or not.

The verification code generation component 210 generates or identifies a verification code to be transmitted to a user. It may generate a verification code using a random number generator or an algorithm for generating verification codes. The verification code generation component may also identify a stored verification code that is to be sent to a user.

The communication component 220 transmits and receives verification messages and user data. It may transmit and receive verification messages to and from third parties (e.g., websites) and users (e.g., registrants). It also is configured to receive user data, such as data submitted by a registrant (e.g., via a form displayed on a website). It may also transmit web or application data to a third party or a user.

The verification code comparison component 230 compares transmitted and received verification codes. For example, the verification code comparison component may compare a verification code transmitted via SMS message to a user with a verification code received from a user via a website form. It may also compare a verification code provided via an application or webpage to a user with a verification code received from a user via an SMS or other message. The verification code comparison component is configured to determine whether a transmitted verification code substantially matches a received verification code. The verification code comparison component also generates verification alerts. For example, if a first transmitted verification code substantially matches a first received verification code and a second transmitted verification code substantially matches a second received verification code, the verification code comparison component generates an alert that the user is verified. In some implementations, the verification code comparison component determines that a transmitted verification code and a received verification code substantially match when the received verification code includes a substantial amount of data that is identical to data of the transmitted verification code. For example, a transmitted verification code consisting of an alphanumeric string may be determined to substantially match a received verification code if the received verification code includes a majority of the characters of the transmitted alphanumeric string.

The user analysis component 240 is configured to analyze user data or a verification message received from a user or a third party or identified in data storage area 250 to identify information associated with a user. For example, the user analysis component may analyze a message to identify a phone number from which the verification message was sent. The user analysis component also gathers data from data storage area 250 related to a previously-registered user who is being authenticated by the dual code verification system.

Suitable Processes

Figure 3:
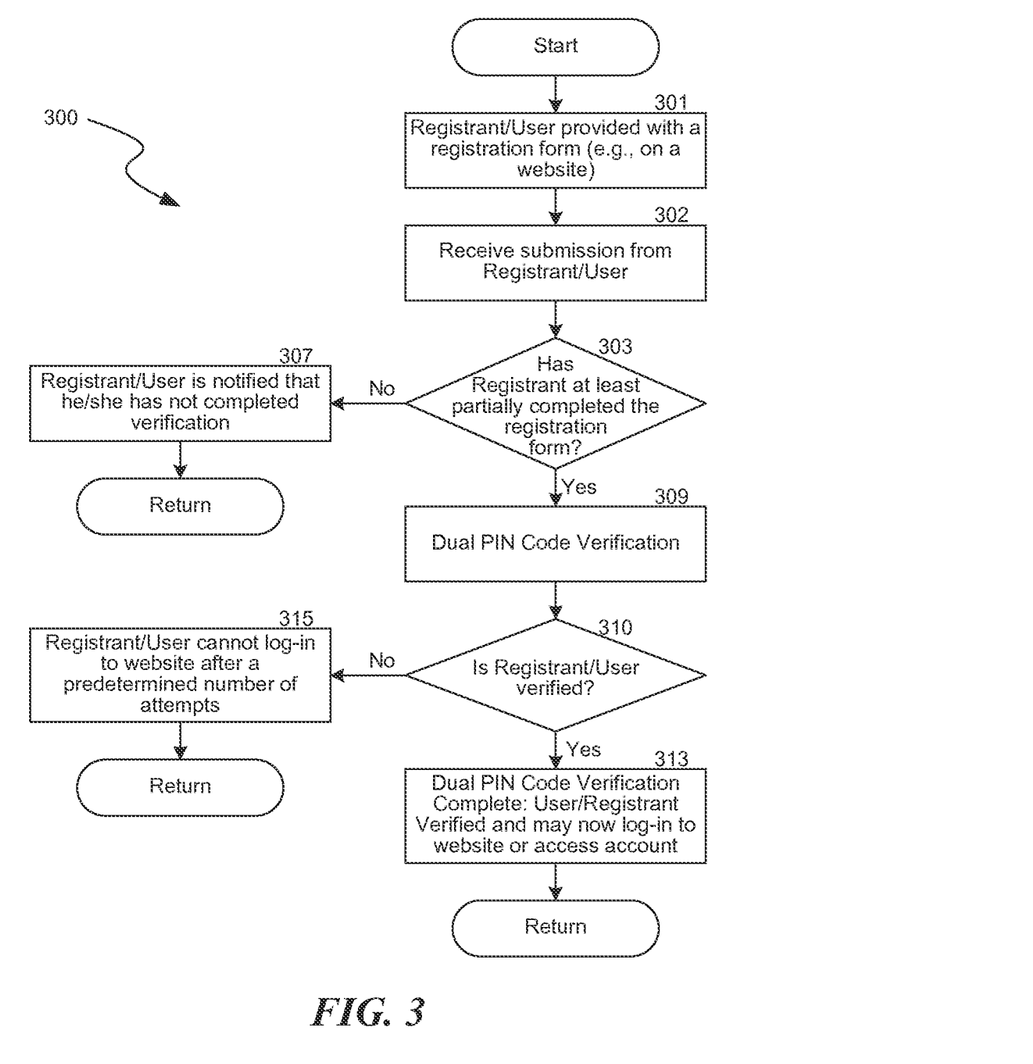
FIG. 3 is a flow diagram depicting a method performed by the dual code verification system to verify a user.

FIG. 3 is a flow diagram of a process 300 implemented by the dual code verification system 200 for verifying a user attempting to register using an on-line registration form that is accessed through a website. In some implementations, the system performs the process without using an on-line form. In some implementations, the verification and notification processes described herein can also be achieved through other registration forms, such as a handwritten form. In some embodiments, the registrant or user is informed via the registration website to communicate an electronic contact (as defined above), such as through an SMS message using an SMS-enabled handset or similar device, to the contact number (as defined above) provided on the website. A concern that the present disclosure addresses is that in a typical system where the registrant or user is contacted via a means of communication (including but not limited to e-mail), that means of communication can easily be intercepted, stopped, filtered, trashed, or deleted by a third party. However, where the registrant or user directly sends the verification code via electronic message or SMS, as in the present invention, and the dual code verification system or website responds by generating a different verification code that is sent back to the registrant's or user's same communication device, there is increased security as a result of the dual code verification confirmation. Additional increased security is further derived where the dual code authentication system prevents "man in the middle" attacks that cannot be solved by an easily intercepted single layer of authentication.

In some implementations, a user is a registrant, end-user, or user filling out a registration form in order to register with a website, on-line merchant, e-commerce site, business, etc. A registrant includes, for example, a consumer, which can be an individual, but can also be a company, organization, the government, and so on. Sometimes, the registrant is registering with another business. For example, the registrant can be an individual attempting to access a website and set up an account with a financial institution. The various identities and types of user and business may vary, as may the purpose of registration and verification.

As illustrated in FIG. 3, at a block 301, the user is provided with a registration form. For example, the form may be provided via a website. At a block 302, the system receives a submission from the registrant/user in response to the form. At a decision block 303, the system determines whether the registrant has at least partially completed the registration form. If the user has not at least partially completed the form, at a block 307, the user is notified that he or she did not complete the verification. However, if the user does at least partially fill out the form, the process proceeds to a block 309, and the system performs a dual code verification. Through the dual code verification, the registrant is eventually allowed to log-in to the website at a block 313 after verification, or is denied access at a block 315 to the website if he or she cannot be verified. Thus, at a decision block 310, the system determines whether the registrant/user has been verified, and the process proceeds to block 313 if the system is able to verify the user and to block 315 if the system is not able to verify the user. For verification, the user is routed to or is able to access a webpage that requests dual code verification. The system performs a dual code verification as described herein.

Figure 4:
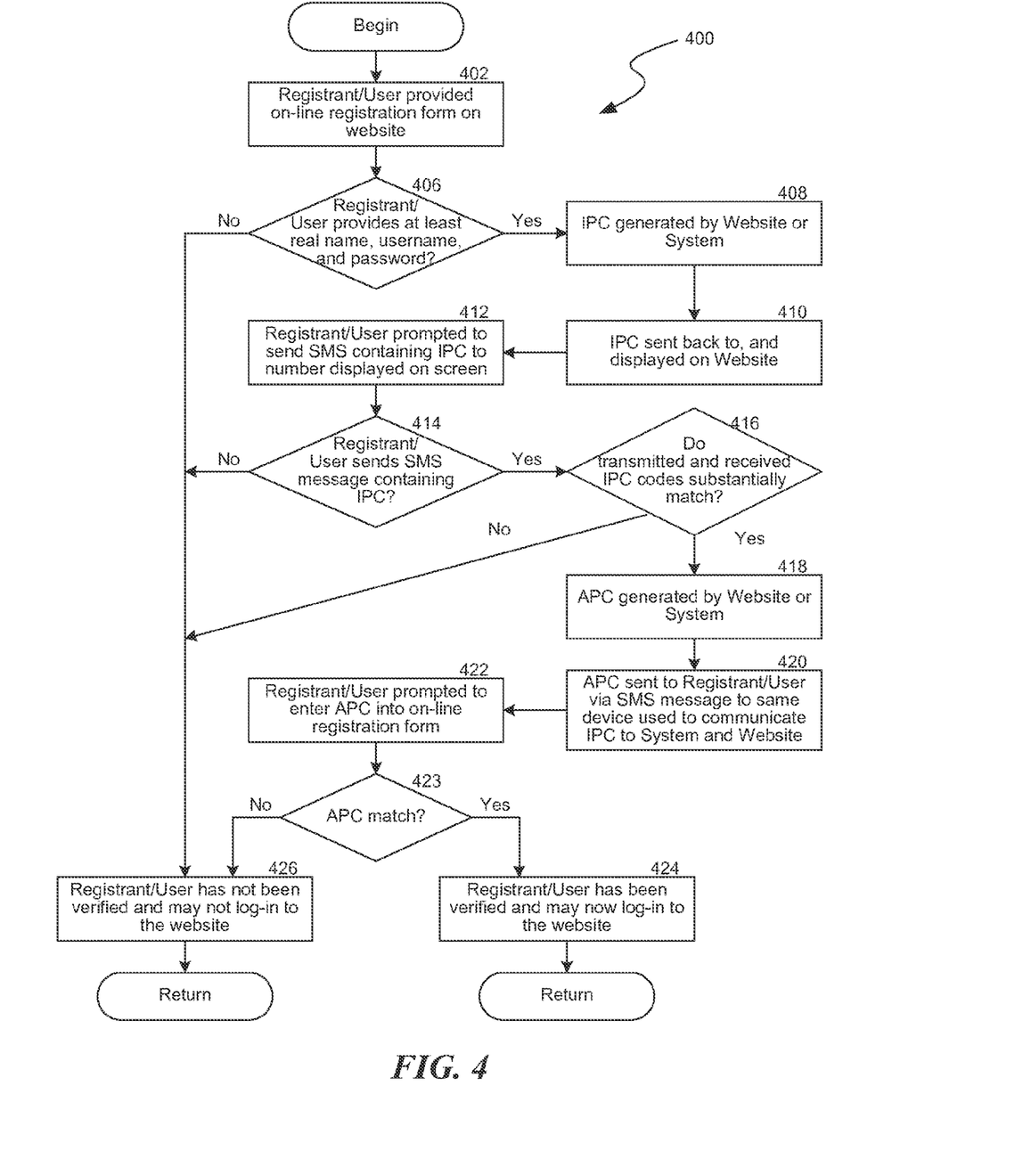
FIG. 4 is a flow diagram depicting a method performed by the dual code verification system to verify a user registering at a website.

FIG. 4 is a flow diagram of a process 400 implemented by the system for performing a dual code verification. The process begins at a block 402, and the user is provided an on-line registration form via a website. At a decision block 406, the system determines whether it has received a name, username, and password from the registrant/user. If the system has not received a name, username, and password from the registrant/user, the process 400 proceeds to a block 426 and the registrant is not verified. If the system does receive this information, the website requests an IPC from the system, and, at a block 408, the system generates the IPC which is passed back to the website. At a block 410, the IPC is displayed by the website. In some embodiments, the website generates the IPC, passing that information back to the system. In some embodiments, the IPC is solely alphabetic. In other embodiments, the IPC is solely numeric. The IPC may also be alphanumeric. At a block 412, the website prompts the registrant to send the IPC in an SMS message using his or her mobile device (e.g., handset or cellular telephone, or equivalent SMS-capable device), to the contact number displayed on the website. At a block 414, the system receives from the user an SMS message addressed to the contact number that includes an IPC. At a decision block 416, the system determines whether the transmitted IPC code substantially matches the received IPC code. In some implementations, the system looks up the IPC to ensure it substantially matches with the generated IPC originally presented to the user, and additionally takes note of the phone number or other identifying communication information used by the user to send the SMS message. In some implementations, the system passes the IPC SMS message sent by the user to the website to verify that the IPC code matches. If the user sent IPC matches the originally generated IPC, at a block 418, the system or website generates a second verification code or APC. At a block 420, this APC is returned back to the user's same handset or other SMS-capable device used to originally communicate the IPC by the user via return-SMS message. In some embodiments, the APC will only be returned to the same device or account associated with the submission of the IPC. In this way, the risk of third party interception is greatly reduced. At a block 422, the registrant is prompted to input the APC into the on-line registration form or website. The on-line registration form is preferably part of the website, but can be part of the verification system by some other means. The verification and authentication is completed if the user enters the correct APC verification code, as verified by the system generating the IPC and APC codes or the website. Thus, at a decision block 423, the dual code verification system determines if the transmitted and received APC codes substantially match one another. If they do match, the process 400 proceeds to a block 424, and the user is verified and allowed to log in to the website. If the user enters an incorrect APC verification code, the process 400 proceeds to a block 426, and the registration process may stop and the user may be denied further access to the website, depending on the verification-requesting-website's preferences.

As described above, a problem with on-line registration is that the user or registrant often registers with untraceable and/or false e-mail addresses and telephone numbers. The present invention provides a process for verifying an on-line registration using an additional layer of security by requiring a dual code confirmation process using the registrant's own handset, cellular telephone, or similar device, in addition to entry of a username and password alone. By requiring the registrant to send the first electronic message to the system, the active-status of the phone number that will be associated with the registrant, as well as the accuracy of the phone number where the second CODE will be communicated to can be further verified. In the event of registrant verification failure, it is assumed that the registrant who is not verified through the verification system or similar manual means is fraudulent. Thereafter, the website owner may elect to contact the registrant to determine why the verification failed. At that point, the contact may be completed by automated or manual means of communication between the website owner and the registrant, including, but not limited to, automatically generated e-mail, manually generated e-mail, manually or automatically generated telephone calls, or text messaging.

Figure 5:
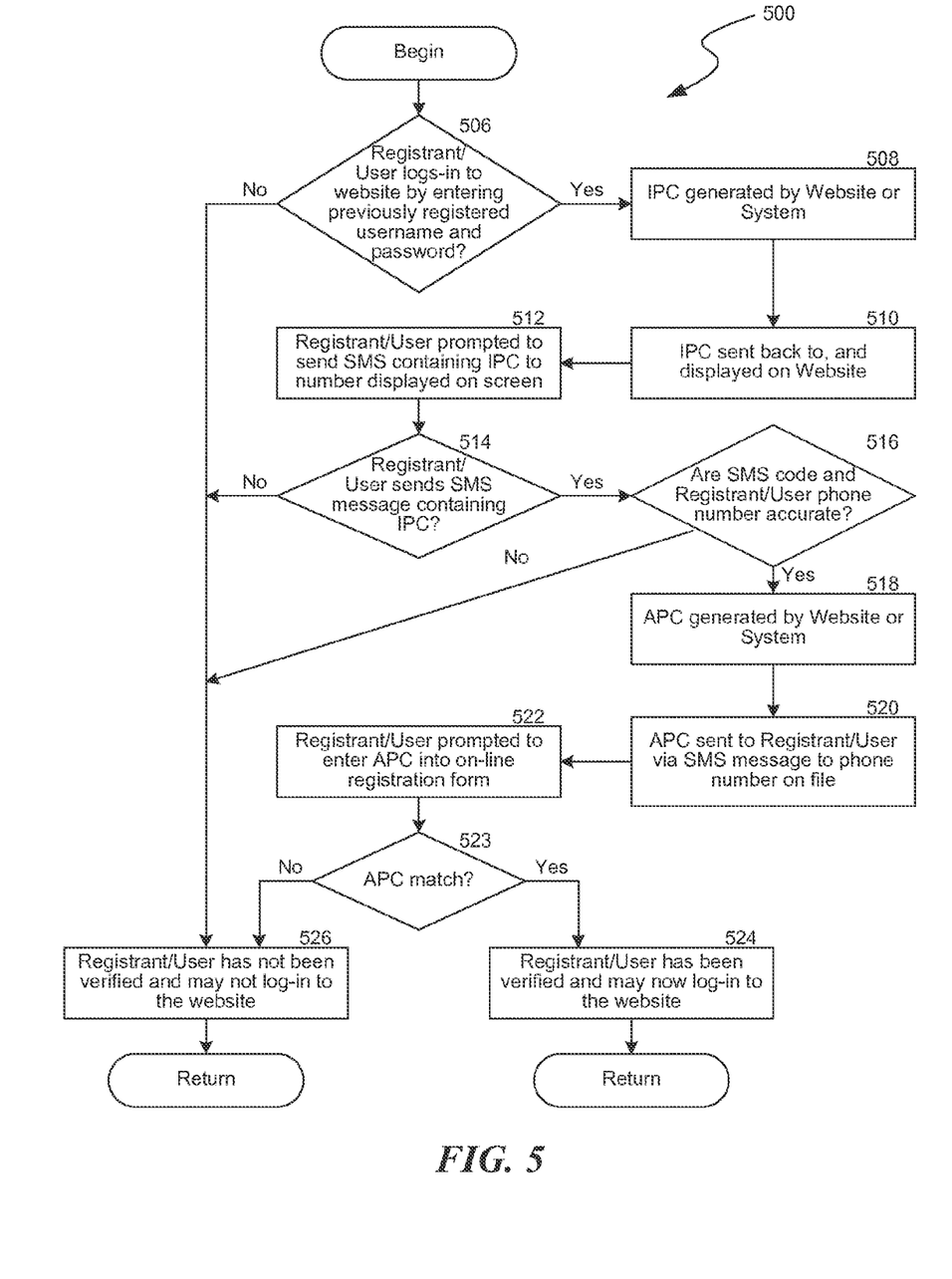
FIG. 5 is a flow diagram depicting a method performed by the dual code verification system to authenticate a user who has already registered at a website.

FIG. 5 is a flow diagram of a process 500 for verifying a user who has previously successfully registered with a website. In this embodiment, the user is returning to the website for a subsequent visit or transaction. At a block 506, the previously-registered user logs in to the website requiring verification with his or her username and password. The user's handset or cellular telephone number, or contact information for a similar SMS-capable device, is already on file with that website. After the user logs-in to the website, the website requests an IPC from the system, which, at a block 508, generates the IPC. At a block 510, the IPC is passed back to the website for display. In some implementations, the website generates the IPC, passing that information back to the system. The IPC may be solely alphabetic, solely numeric, or alphanumeric and is displayed on the website. At a block 512, the dual code verification system displays a message on the website that prompts the user to send an SMS message containing the IPC to a contact number that is also displayed on the website. The user is further prompted to send the SMS message using his or her same mobile device (e.g., handset or cellular telephone number, or other similar SMS-enabled device telephone number), which was already previously registered with the website upon initial registration, displaying at least part of that registered device's phone number on the website. At a decision block 514, the system determines whether the user has sent an SMS message containing the IPC to the contact number displayed on the screen using his or her registered SMS-capable device. At a decision block 516, the telephone number of the device sending the SMS message is verified against the telephone number already on file with the website by either the system or the website. At decision block 516, the system either looks up the IPC to ensure it matches with the generated IPC originally presented to the user or passes the IPC SMS message sent by the user to the website to verify that the IPC code matches. If both the telephone number and the IPC match, at a block 518, a second verification code or APC is generated either by the system or by the website. At a block 520, the APC is returned back to the user's registered handset or cellular telephone, or other SMS-capable device telephone number via return SMS message. At a block 522, the user is prompted to enter the APC into the on-line registration form. At a decision block 523, the transmitted and received APC codes are compared. The verification and authentication process is then completed when the transmitted APC code substantially matches the received APC code. If the entered APC verification code is correct, at a block 524, the user is allowed to log-in to the website. If the APC verification code is incorrect, at a block 526, the log-in process may end and the user may be denied access to the website, depending on the verification-requesting-website's preferences.

The described system performs a verification and authentication process. In some implementations, it comprises the steps of: providing a registration form to a registrant through the registrant's first device; at least partially completing the registration form; communicating a first verification code and system electronic contact to the registrant for verification; verifying the registrant, including a registrant-established connection inputting the first verification code through the registrant's secondary device; secondarily verifying the registrant, including generating a second verification code, and establishing a connection with the registrant via the registrant's secondary device used to communicate the first verification code; communicating the second verification code to the registrant; and inputting the second verification code into an on-line form or other verification system.

From the foregoing, it will be appreciated that specific embodiments of the invention have been described herein for purposes of illustration, but that various modifications may be made without deviating from the scope of the invention. For example, those skilled in the art will appreciate that the depicted flow charts may be altered in a variety of ways. More specifically, the order of the steps may be re-arranged, steps may be performed in parallel, steps may be omitted, other steps may be included, etc. Accordingly, the invention is not limited except as by the appended claims.

I claim:

1. A method for verifying a user who is interacting with a website, the method performed by a processor executing instructions stored in a memory, the method comprising:
    receiving, from the user via the website, a request to access certain functionality of the website;
    performing a first stage of a user verification, wherein the first stage of the user verification includes:
        transmitting a first verification code to the user via the website;
        receiving a first verification message from the user via an application on a mobile communication device, wherein the first verification message includes at least a second verification code; and
        comparing the first verification code and the second verification code; and
    when the first verification code matches the second verification code, performing a second stage of the user verification, wherein the second stage of the user verification includes:
        deriving, from the received first verification message, addressing information associated with the mobile communication device of the user from which the first verification message is received;
        transmitting a second verification message via the application on the mobile communication device using the addressing information associated with the mobile communication device of the user, wherein the second verification message includes at least a third verification code;
        receiving, from the user, a fourth verification code; and
        comparing the third verification code and the fourth verification code; and
    verifying the user when the third verification code matches the fourth verification code.

2. The method of claim 1, wherein:
    the method further includes comparing the derived addressing information to stored addressing information associated with the user.

3. The method of claim 1, wherein the request to access the website is part of a purchase transaction associated with the website.

4. The method of claim 1, wherein transmitting the first verification code to the user includes transmitting an instruction to the user to submit the verification code via an application on the mobile communication device.

5. The method of claim 1, wherein receiving from the user the request to access the website includes receiving information submitted by the user via a form of the website.

6. The method of claim 1, wherein receiving from the user the fourth verification code includes receiving the fourth verification code via a field of a form of the website.

7. The method of claim 1, wherein receiving, from the user, the request to access the website includes receiving login information.

8. The method of claim 1, wherein the addressing information associated with the mobile communication device of the user is a phone number.

9. A system for verifying a user who is interacting with a website, the system comprising:
    a memory storing computer-executable instructions comprising:
        a communication component configured to:
            receive, from the user via the website, a request to access certain functionality of the website;
            transmit a first verification code to the user via the website;
            receive a first verification message from the user via an application on a mobile communication device, wherein the first verification message includes at least a second verification code;
            when the first verification code matches the second verification code, transmit a second verification message via the application using addressing information associated with the mobile communication device of the user, wherein the second verification messages includes at least a third verification code; and receive, from the user, a fourth verification code;

a verification code comparison component configured to:
  compare the first verification code and the second verification code;
  compare the third verification code and the fourth verification code; and
  verify the user when the third verification code matches the fourth verification code; and a user analysis component configured to:
  derive, from the first verification message, the addressing information associated with the mobile communication device of the user from which the first verification message is received; and a processor for executing the computer-executable instructions stored in the memory.

10. The system of claim 9, wherein:
the verification code comparison component is further configured to compare the derived addressing information to stored addressing information associated with the user.

11. The system of claim 9, wherein the request to access the website is part of a purchase transaction associated with the website.

12. The system of claim 9, wherein the communication component is further configured to transmit an instruction to the user to submit the second verification code using an application on the mobile communication device.

13. The system of claim 9, wherein the communication component is further configured to receive information submitted by the user via a form of the website.

14. The system of claim 9, wherein the communication component is further configured to receive the fourth verification code via a field of a form of the website.

15. The system of claim 9, wherein the communication component is further configured to receive login information as at least part of the request to access the website.

16. The system of claim 9, wherein the addressing information associated with the mobile communication device of the user is a phone number.

17. A non-transitory computer-readable storage medium with instructions stored thereon that, when executed by a computing system, cause the computing system to perform a method that verifies a user interacting with a website, the method comprising:
  receiving, from the user via the website, a request to access certain functionality of the website;
  performing a first stage of a user verification, wherein the first stage of the user verification includes:
    transmitting a first verification code to the user via the website;
    receiving a first verification message from the user via an application on a mobile communication device, wherein the first verification message includes at least a second verification code; and
    comparing the first verification code and the second verification code; and
  when the first verification code matches the second verification code, performing a second stage of the user verification, wherein the second stage of the user verification includes:
    deriving, from the received first verification message, addressing information associated with the mobile communication device of the user from which the first verification message is received;
    transmitting a second verification message via the application on the mobile communication device using the addressing information associated with the mobile communication device of the user, wherein the second verification message includes at least a third verification code;
    receiving, from the user, a fourth verification code; and
    comparing the third verification code and the fourth verification code; and
  verifying the user when the third verification code matches the fourth verification code.

18. The non-transitory computer-readable storage medium of claim 17, wherein:
the method further comprises comparing the derived addressing information to a stored addressing information associated with the user.

19. The non-transitory computer-readable storage medium of claim 17, wherein the request to access the website is part of a purchase transaction associated with the website.

20. A non-transitory computer-readable storage medium with instructions stored thereon that, when executed by a computing system, cause the computing system to perform a method that verifies a user interacting with a website, the method comprising:
  receiving, from the user via the website, information submitted by the user to the website via a form displayed on the webpage;
  performing a first stage of a user verification, wherein the first stage of the user verification includes:
    transmitting a first verification code to the user via the website;
    receiving a first verification message from the user via an application on a mobile communication device, wherein the first verification message includes at least a second verification code; and
    comparing the first verification code and the second verification code; and
  when the first verification code matches the second verification code, performing a second stage of the user verification, wherein the second stage of the user verification includes:
    deriving, from the received first verification message, addressing information associated with the mobile communication device of the user from which the first verification message is received;
    transmitting a second verification message via the application on the mobile communication device using the addressing information associated with the mobile communication device of the user, wherein the second verification message includes at least a third verification code;
    receiving, from the user, a fourth verification code; and
    comparing the third verification code and the fourth verification code; and
  verifying the user when the third verification code matches the fourth verification code.

21. The non-transitory computer-readable storage medium of claim 20, wherein:
the method further comprises comparing the derived addressing information to a stored addressing information associated with the user.

22. The non-transitory computer-readable storage medium of claim 20, wherein transmitting the first verification code includes transmitting an instruction to the user to submit the verification code via an application on the mobile communication device.

\* \* \* \* \*